3,438,785
INSTANT TEA FROM FRESH GREEN LEAF

Wolfgang Zameitat, Agrapatna, Ceylon, and Roy E. Morse, Ridgewood, N.J., assignors to Thomas J. Lipton Inc., Englewood Cliffs, N.J., a corporation of Delaware
No Drawing. Filed Aug. 9, 1966, Ser. No. 576,171
Int. Cl. A23f 3/02
U.S. Cl. 99—77                                                          12 Claims This invention relates to a novel process for treating fresh green tea leaf containing naturally occurring enzymes and to a novel process for the manufacture of soluble tea powders from fresh green tea leaves.

The basic steps in the manufacture of black tea are well known in the art. Briefly, black tea is manufactured from freshly plucked green tea leaf by first permitting the freshly plucked leaf to wither, thereby to lose from 10% to 50% of its original moisture content; second, rolling the withered tea leaf in order to break up the cellular structure of the leaf and to expose the juices thereof to air; third, fermenting the rolled leaf to develop the desired flavor and color qualities; and finally, firing the fermented leaf in order to dry the leaf and to stop the enzymic oxidation reactions. The manufacture of black tea is fully described in the book "The Culture and Marketing of Tea," 3rd Edition by C. R. Harler (Oxford University Press, 1964). Reference thereto may be had for a fuller description of the manufacture of black tea.

In the manufacture of instant tea powder, an infusion is prepared from the black tea manufactured as outlined above and the infusion is then evaporated to dryness. The solids thereby recovered are the soluble tea powders of commerce.

In the preparation of soluble tea powders, significant economies can be effected by preparing the tea infusion from the fermented leaf before the latter has been subjected to the firing and drying step. The infusion prepared from the freshly fermented leaf is dried in the customary manner to produce a soluble tea powder. The resulting product bears a close similarity in flavor to tea infusions which have been freshly prepared from commercial black tea and is even considered by some experts to approximate more closely the flavor of fresh tea infusions than conventional soluble tea powders.

Even with the foregoing economies, however, there is a significant incentive to improve further the manufacture of soluble tea powder. For example, the process of withering the fresh green tea leaves prior to fermentation requires extensive facilities. In many tea factories, the physical facilities required for withering constitute a major portion of the required investment, since it is necessary to permit the tea leaves to wither for periods of up to 18 hours. The facilities required for fermentation also contribute to the investment required in the manufacture of tea. Fermentation times are normally much shorter than withering times, the time for fermentation typically being in the order to 2 to 5 hours. Nevertheless, the space required to hold tea in process for this amount of time cannot be considered to be a negligible part of the investment.

The present invention provides a process which introduces substantial economies into the manufacture of tea. The process is characterized by the steps of:

(a) Rolling green tea leaves containing naturally occurring enzymes concurrently with a rolling additive which is effective more thoroughly to break down the cellular structure of the leaf and to expose the tea juices to air and further to maintain a fluffiness in the rolled tea thereby to permit the ready access of air thereto; and (b) Fermenting the rolled leaf to develop a desirable black tea flavor.

In preparing tea powders from the fermented tea of the above described process, the fermented tea is extracted (without an intervening firing step) and the infusion thereby prepared is treated in a conventional manner to obtain the soluble tea powder.

The principal steps of the above outlined process are more specifically described as follows:

In the process of the present invention, the tea leaves may be used as plucked or, if desired, they may be subjected to a wither. The function of withering is primarily to reduce the moisture content of the fresh leaf and thereby to avoid an excess of tea juices during the subsequent rolling step. In the absence of withering there is normally a significant loss of juices during rolling. It has sometimes been suggested in tea art that the withering step also has an influence on the flavor of the resulting tea. However, in the present process, flavor effects due to the extent of withering are not normally detectable. While the process of the present invention is capable of employing unwithered leaf, it may not always be desirable to do so because of particular conditions (discussed below) which lead to loss of juices. In such cases, the process of the present invention will include an antecedent withering step to reduce the moisture content of the leaf.

In order to serve the primary function of withering, a number of factors are important. Accordingly, it is difficult to provide a clear cut quantitative measure of the amount of withering which is required. Laboratory studies have suggested that withering may be characterized by the amount of moisture lost by the tea leaf. A tea leaf which has been subjected to a light wither will normally lose about 10% of its original moisture, while a leaf which has been subjected to extensive withering may lose as much as 40% or 50% of its original moisture. In the present invention, a wither which results in the loss of from 0% to 30% of the original moisture content is contemplated as being preferred.

It will become evident from the further description of the present invention below, that while no withering, or only minimal amounts of withering, may be required, the invention is generally applicable even though the tea leaves may have been withered more than is necessary to avoid loss of juices. However, for good commercial practice, the above-described minimal ranges are preferred as there is little to be gained by withering the leaf more than necessary.

It will be evident that among the factors affecting the extent of withering which is required is the time which elapses between the plucking of the tea leaf and the receipt thereof in the factory. Obviously, leaf which is received in the factory within an hour after it is plucked will be fresher, and contain more moisture than leaf which is not received in the factory for several hours following plucking. Weather conditions also will affect the freshness of the plucked leaf as it is received in the factory.

The amount of withering required is also related to the machinery employed for rolling the tea leaf. The traditional Dhool equipment which involves pressing the withered tea leaf against a rotating plate is recognized to require greater withering because the pressures generated during Dhooling tend to express the natural leaf juices. More modern equipment such as the McTear Rotovane and the McKercher C.T.C. machine are capable of employing leaf which has been less extensively withered than is required for the traditional Dhool. Additional types of rolling equipment are stainless steel Fitzpatrick Mills and Clievemeare rolls.

As already mentioned, in the present invention there is provided during the rolling step a rolling additive which promotes the shredding of the leaf, the breakdown of the cellular structure thereof and the exposure of the juice on an increased surface. Additionally, the rolling additive ingredient tends to adsorb or to adsorb the juices liberated during rolling, thereby reducing the propensity of the leaf to lose valuable juices during rolling. Accordingly, the presence of the rolling additive permits the use of leaf which has been even less extensively withered than is normally required in the modern machinery such as the Rotovane machine.

It will be obvious that rolling additive materials may have widely differing capacities for the absorption of moisture. As is discussed in greater detail below, possible rolling additives which may be used in the present invention include pure sand and dried black tea containing fibrous stalk and stem residues. The latter material is significantly more absorptive than is sand. Where an absorptive rolling additive such as black tea is employed, it will in many instances be possible to employ tea leaf which has been subjected to only very light withering or to no withering at all.

Taking the foregoing into consideration, those skilled in the art can readily ascertain by experience the amount of wither which is needed to prevent the loss of juices during rolling.

The conditions under which withering is effected are well known in the art, and it is contemplated that the withering process will be carried out under the conventional conditions. As described, for example, by C. R. Harler in his book "Tea Manufacture," withering is effected by spreading the freshly plucked leaf on large trays which are normally provided with a mesh bottom in order to permit circulation of air therethrough. In some seasons of the year withering may be effected naturally by exposing the freshly picked leaf to ambient atmospheric conditions. However, during the cooler seasons of the year, when temperatures drop to 70° or below, it is common to provide for supplementary heating which will maintain the temperature in the withering sheds at 80°–90°. In order to promote adequate air circulation, it is frequently common also to provide forced circulation by means of fans in withering sheds.

Following withering, the tea leaf is rolled. As is well known in the art, the function of rolling is to damage the cellular structure of the tea leaf in such a way that the cellular structure thereof is distorted or broken down and the tea leaf juices are thereby exposed to fermentation. In the present invention it has been found that the rolling step can be significantly improved by providing for the presence during rolling of a rolling additive. The additive may be combined with the withered tea leaf at any convenient time. For most effective results, it is obviously desirable that the leaf and abrasive material be thoroughly intermingled with each other. This may be accomplished by preblending the tea leaf and the additive. However, it is normally more convenient, and equally effective, to feed the withered tea leaf and the additive into the opening of the equipment used for rolling, and permit them to blend within the rolling machine.

As already mentioned, the rolling additive serves at least four functions in the rolling step. It promotes the breaking up of the cell structure of the leaf; it maintains the rolled leaf in a substantially more fluffy condition, thereby facilitating the subsequent fermentation step; it tends to absorb juices liberated during the rolling step, thereby to prevent their loss; and it provides a significant increase in surface on which the tea juices are exposed to air for fermentation.

A wide variety of rolling additives may be used in the present invention. In general, the rolling additives should be innocuous, reference being made in this respect to the fact that the additive is of such a composition that it will not adversely effect the flavor of the resulting tea product. This means that the additive should be an inert compound which will not react with the acid tea juices, and be of such an origin that it does not contain extraneous flavor bodies which would be objectionable.

One broad class of abrasive materials which are contemplated within the scope of the present invention are the insert silicious minerals widely available of which kieselguhr, sand and quartz are representative. Also included are silicious minerals such as the calcium-aluminum silicates (of which mica is representative) and the synthetic calcium silicates.

Still another class of inorganic materials which may be used are the insoluble salts of various mineral acids, for example, calcium sulfate and the neutral calcium phosphates which are widely used as dental abrasives.

Because the tea juices are relatively acid, substances which react with acids (for example, powdered metals and alkaline substances such as aluminum hydroxide, aluminum oxide, calcium carbonate, etc.) should normally be avoided.

The inorganic materials of the types generally described above should not be excessively fine in particle size. Extremely, fine materials would not have the effectiveness which is desired in breaking up the cell structure. In general, suitable materials should have a minimum average particle diameter in the order of 100 microns. The materials may have average particle diameters in the order of 3000 microns. In connection with this, it will be observed also that because of the grinding action which is brought about by the rolling equipment, the particle size of the rolling additives will be degraded during rolling to some extent.

It will be noted that a number of the silicious minerals are widely found in nature in clays and talc. It should be recognized in connection with this, however, that the effective particle diameter of most clay substances is extraordinarily fine, well below the minimum average particle diameters mentioned above. Accordingly, clays and talc will normally not be suitable for use in the present invention.

A wide variety of organic materials may also be used as the rolling additive of the present invention. One broad group to which reference is made includes cellulosic fibrous materials such as paper, wood pulps, certain types of filter aids, and the like. Included within the fibrous organic materials is dried black tea which contains significant amounts of fibrous steam and stalk materials. Because of its fibrous structure, the black tea is capable of effectively promoting the desired abrading and fluffing action during rolling. In this respect, the stalk and stem portions are usually more effective than the leaf itself. Accordingly, the use of material containing substantial amounts of stem and other fibers of the leaf plant is preferred.

A typical material which may be used, for example, is the stem and stalk residue recovered by the electrostatic separation of black tea leaf from the residual stalk after the former has been fired. The stem and stalk residue will be referred to hereafter as "electrostatic black tea." In addition to having the desired abrasive and fluffing action, electrostatic black tea also has a high absorbability for the juices liberated during rolling. It is moreover, innocuous since its use will not adversely affect the flavor of the tea product. Indeed, the extractable black tea solids remaining in the electrostatic black tea contribute significantly to the tea solids which are recovered and, in some tests, which have been performed, it has been found that electrostatic black tea produces a desirable improvement in flavor.

Another material which has also been found to be particularly effective is dried green leaf. An appropriate dried green leaf for this purpose may be obtained by simply drying a portion of the fresh leaf as received and combining the resulting dried leaf with the balance of the fresh leaf in the rolling machine.

Another class of fibrous organic material to which reference may be made are the synthetic fibrous materials of which may are available. Suitably innocuous synthetic fibrous materials are technologically capable of making excellent rolling additives, although it will be recognized that as an economic matter, their use may not be competitive with materials more readily available such as electrostatic black tea.

Still further another class of materials which may be used are pulverulent substances or organic origin, either natural or synthetic. For example, powdered cork and many powdered plastics may be used as abrasive materials.

To summarize, it may be stated that rolling additives are materials selected from the group consisting of water insoluble, innocuous, powdered and fibrous substances having effective particle diameters of at least about 100 microns and having the property of promoting the maceration of the tea leaf fiber and the cell shearing action during rolling, and the exposure of tea juices to air.

The amount of the rolling additive required may vary considerably. For example, there may be as little as 10% rolling additives based on the weight of the fresh green leaf. While such small amounts of rolling additives will provide detectable improvements in the rolling of tea, somewhat greater amounts will normally be desired for economic results, typically in the order of 30% to 100%. The maximum amount of rolling additives which can be used is limited primarily by economic considerations and the capacity of the rolling machinery. For example, if excessive amounts of additive are present, the capacity of the rolling equipment to process green tea leaf will be seriously curtailed. Accordingly, it will not normally be desired to use more than 100% of the additive based on the weight of the fresh green leaf.

Where mixtures of black tea stem and stalk material are employed, the amount thereof which is acceptable within the general limitations will normally provide between 30% and 75% of the total solids of the soluble tea product. In a particularly preferred embodiment, the soluble tea product will contain approximately equal portions of solids derived from fresh green leaf and solids derived from black tea.

As already mentioned, the presence of significant amounts of tea solids derived from black tea sources in the present invention has been found to provide in some cases a desirable improvement in flavor, although the reason for this is not understood. At least one factor which is recognized, however, is the improved stability in flavor which the presence of significant amounts of black tea solids provides. Due to seasonal variations, there is frequently a substantial fluctuation in the flavor quality of soluble tea powders derived wholly from green tea sources and it is believed that the presence of from 30% to 75% black tea solids in the soluble tea powder tends to stabilize the flavor quality of the product.

In the rolling step of the present invention, any of the conventional equipment which is known in the art may be used. However, it is preferred to use modern equipment such as a Rotovan machine, a C.T.C. machine, a Clivemeare mill or a Fitzpatrick mill. Two or more machines may be used successively if desired. Following the rolling step, it may be desirable to improve the fluffiness of the rolled tea by passing it through a ball breaker.

In general principle, the modern machines such as the McTear Rotovan and the C.T.C. machine provide mechanisms for forcing a relatively thin layer of tea into abrasive contact with a surface moving relative to the tea leaf. This results in a crushing and abrasive action which distorts the cellular structure of the leaf and thereby causes it to break. In the C.T.C. machine, for example, two engraved metal rolls are provided which operate like a mangle. The rolls operate at differential speeds, however, i.e. one at a speed of 70 r.p.m. and the other at a speed of 700 r.p.m. In the Rotovan, there is provided a cylindrical shell having a vaned rotating shaft mounted within it which forces the tea in an abrasive motion against the internal surface of the outer shell. A variety of other devices providing the equivalent crushing and tearing action can be visualized, and all such devices are contemplated by the present invention. These and other devices are more fully described in the book by C. R. Harler, referred to above.

In a further modification of the present invention it has been found that the fermentation process is significantly improved and shortened by providing for oxygen injection to the rolling machine. While pure oxygen may be used if desired, it will normally be more practical commercially to employ air for this purpose.

The fermentation time also may be significantly reduced by moderately warming the rolling machine. Generally, temperatures above about 80° F. but less than the temperature which will deactivate the naturally occurring enzymes will be sufficient. Merely pre-warming the working surfaces of the rolling machine to about 95°–100° F. will yield a significant improvement. Since rolling is carried out in batch or semi-batch operations, there are normally significant portions of the rolling step conducted at less than the optimum temperature. Pre-warming provides a more nearly steady state operation. Depending on the nature and moisture content of the rolling additive and the tea leaf, a high shearing action may occur which will require cooling of the rolling equipment, especially during the later stages thereof, to prevent the temperature from exceeding the desired level. These further modifications open the way to completing the fermentation step entirely within the rolling equipment, thereby introducing significant economies in the manufacture of soluble tea powders.

The mixture of rolled leaf and rolling additive is permitted to ferment sufficiently to develop the desirable black tea flavor. As known in the art, fermentation involves the enzymic oxidation of certain constituents present in the tea leaf and is the means by which the characteristic flavor of black tea is developed. Important separate elements of flavor which are evaluated by expert tea tasters are briskness, strength, color and quality. The fermentation time required to produce an optimum blend of these four elements is determined through trial. In conventional fermentation, the highest value teas are normally obtained if the tea is allowed to ferment for a period of from 2 to 3½ hours. In the present invention, fermentation proceeds at a significantly greater rate because of the improved accessibility of air which is provided by the presence of the additive. Accordingly, the optimum fermentation time in the present invention is in the order of about 1 to 1½ hours.

It should be recognized that the fermentation reactions commence when the freshly withered leaf is first subjected to the action of the rolling machine and continue until the enzymes are thermally deactivated, as for example, by the hot water used in extraction. Accordingly, the ferementation times given herein should be measured from the time when rolling starts until the time when the tea is extracted.

Fermentation conditions follow those conventional. Typically, fermentation is carried out at temperatures of 70° to 90° F. As noted above, fermentation within the rolling equipment may advantageously proceed at temperatures of 90° to 100° F. Ample access to air should be provided.

Following fermentation, the fermented leaf is extracted using water which has been heated to incipient boiling. The hot water of the extract step is effective to deactivate the enzymes responsible for the fermentation. Accordingly, a separate step for deactivating the leaf enzymes and terminating the fermentation reactions is unnecessary.

A wide variety of equipment has been proposed for extraction of tea leaf in the preparation of instant tea powders. Any of such equipment may be used in the practice of the present invention.

It has been found that the source of the water is not critical. Satisfactory results have been obtained using well water which is available at the plant site.

It is known in the art that the extent of extraction is an important factor in the preparation of soluble tea powders. For typical commercial operations, approximately 75% to 85% of the extractable solids will be recovered. Excellent tea powders can be prepared, of course, using extraction efficiencies of less than 75%. However, the lower the extraction efficiency, the less economical is the operation. On the other hand, it is also recognized that the amount of extraction should not normally be permitted to reach too high a level inasmuch as the flavor of the resulting tea powders is adversely affected by attempting to extract all or substantially all of the extractable solids from the tea leaf. The extent of extraction employed in the preparation of tea powders in accordance with the present invention follows that which is conventional in the art.

Following extraction, the infusion thereby obtained is processed by evaporation, drying and optionally decreaming to produce a soluble tea powder.

A modification of the foregoing process which may be used, if desired, is to subject some or all of the fermented leaf to an aroma recovery step prior to extraction. This is accomplished by steam stripping followed by condensation and recovery of the volatiles thereby removed. An alternative method of aroma recovery is to recover the aroma from the infusion, and to thereby preserve it from loss by evaporation during concentration of the infusion. Aromatic essences thus recovered are added to the dried powder described above to prepare the finished soluble tea powder.

The present invention is further illustrated by the following examples:

Example 1

After freshly plucked green tea leaves were received at a processing plant they were weighed and transferred to withering tables. The leaves on the withering tables were piled 10 to 12 in. deep. When it was necessary to store the leaves to await withering, they were moistened to cool.

During the dry season, ordinary air was blown through the beds of leaves to obtain withering. In the wet season, however, the air was heated by an oil burner to approximately 86° to 90° F. The freshly plucked leaf was withered to about a 12% moisture loss.

432 parts of the withered green leaf were combined with about 132 parts of electrostatic black tea and the mixture was then rolled in two successive Rotovane machines and the Rotovaned product was then passed through a ball breaker to improve fluffiness. The electrostatic black tea contained about 9% moisture and about 33.5% extractable tea solids by the A.O.A.C. method. It was found that the simultaneous rolling of the green tea leaf and electrostatic black tea resulted in some fermentation in the Rotovane. This was evidenced by a rise in temperature during rolling. The rolled product was allowed to ferment for approximately 1¼ hours (including the rolling time). By contrast, in conventional rolling using a Rotovane machine, fermentation for about 2 hours is needed. The temperature of the material in leaving the Rotovane was approximately 92° F. and at the end of fermentation was approximately 89° F.

Following fermentation, the fermented material was extracted with water at a temperature of approximately 205° F. (which was the incipient boiling temperature at high altitude where this test was carried out). The resulting extract was converted to a soluble tea powder.

Example 2

Example 1 was repeated employing an unwithered tea leaf in place of the lightly withered tea leaf, in a proportion of approximately 40 lbs. of unwithered leaf for 11 lbs. of dry electrostatic black tea. The rolled leaf was juicier than when using partially withered leaf, but it was still very fluffy and well comminuted. The rolled leaf was fermented for about 1½ hours, and then extracted.

Tea made from the resulting powder was judged to have extra qualities of freshness, body and fullness.

Example 3

In still another experiment, Example 1 was repeated. Provision was made for injecting oxygen into one of the Rotovane machines. Fermentation was found to be complete at the end of 1 hour. The teas prepared from the resulting soluble tea powders were considered to have excelent qualities of freshness, body, fullness and color.

Example 4

The time required for fermentation can also be reduced by warming the rolling machines. In one illustration, Example 1 was repeated, however, pre-warming the Rotovane machine with hot water to about 100° F. After the equipment had been in operation for 15 minutes, the rolled material was observed to have the following temperatures:

| From: | ° F. |
|---|---|
| Rotovane #1 | 86–90 |
| Rotovane #2 | 97–102 |
| Ball breaker | 84–90 |

Fermentation was complete at the end of one hour. The fermented material had a temperature of 86°–90° F.

Example 5

Example 1 was repeated but instead of electrostatic black tea, the same amount of kieselguhr was used. The moisture content of the rolled leaf was about the same as in Example 1, but because of the higher shearing action, it was necessary to cool the Rotovanes by a water jacket with water of about 50° F.

After the equipment and the cooling had been in operation for 15 minutes, the rolled material was observed to have the following temperatures, from Rotovane #1 91°–93°, Rotovane #2 99°–103° F., from Ball-Breaker 86°–89° F. The fermentation was completed at the end of 1 hour.

Because of the higher shearing action, the cellular structure was broken better than in Example 1, and the fermenting time was cut down by ¼ of an hour. The temperature of the fermented material was approximately 89°–90° F.

In spray drying the foregoing infusions it was found that powders having desirable densities were obtained, typically in the order of 80 gm./liter.

While the basic process of the present invention, i.e. of rolling green tea in the presence of a rolling additive and fermenting, has been described particularly in connection with the manufacture of soluble tea powders, in the broadest contex, the invention is not limited thereto. If desired, for example, the fermented tea leaf prepared in accordance with the present invention using electrostatic black tea or dried green tea leaf as the rolling additive may be fired, thereby to convert it into dried black tea. Appropriate means such as electrostatic separation, may then be employed to separate the fibrous electrostatic black tea (particularly where this has been used as the additive) from the dried leaf so that the product will meet the government standards relating to the amount of stem material which may be accepted in commercial black tea.

We claim:

1. A process for treating green tea leaf containing naturally occurring enzymes comprising the steps of
  (a) rolling said leaf in the presence of a rolling additive which is selected from the group consisting of water-insoluble, innocuous, powered and fibrous substances having an average particle diameter of at least about 100 microns, said substance being effective to promote the maceration of the tea leaf and to break down the cellular structure thereof and to expose the leaf juices to the action of oxygen, the amount of said rolling additive being at least about 10% by weight of said leaf; and (b) fermenting the rolled tea leaf to develop a desirable black tea flavor 2. A process according to claim 1, wherein said leaf is a freshly plucked leaf which has been withered to a moisture loss of up to 30% prior to rolling.

3. A process according to claim 1, wherein said leaf is rolled by forcing said tea leaf into abrasive contact with a surface moving relative to said leaf.

4. A process according to claim 3, including the step of maintaining the temperature of said surface above 80° F., but less than that temperature which deactivates the leaf enzymes.

5. A process according to claim 3, including the step of warming said surface to a temperature of about 95° F. but not exceeding that temperature which deactivates leaf enzymes before rolling said leaf against it.

6. The process according to claim 1, wherein supplementary oxygen is provided during the rolling of said leaf.

7. A process according to claim 1, wherein said rolling additive is black tea containing substantial amounts of stem and stalk material.

8. A process according to claim 7, wherein the amount of said black tea is sufficient to provide from about 25% to about 76% by weight of the solids in the soluble tea powder.

9. A process according to claim 1, wherein said rolling additive is dried green tea.

10. A process according to claim 1, including the steps of (c) extracting the fermented tea leaf to obtain a tea infusion; and (d) thereafter drying the resulting infusion to obtain a soluble tea powder.

11. A process according to claim 10, wherein said rolling additive is black tea containing substantial amounts of stem and stalk material.

12. A process according to claim 10 wherein said leaf is a freshly plucked leaf which has been withered to a moisture loss of up to 30% prior to rolling.

References Cited

UNITED STATES PATENTS 2,863,775  12/1958  Perech _____ 99—77

FOREIGN PATENTS 4,299      1899     Great Britain.
661,699    11/1951  Great Britain.

RAYMOND N. JONES, *Primary Examiner.*

J. R. HOFFMAN, *Assistant Examiner.*

U.S. Cl. X.R.

99—76